Patented May 27, 1930

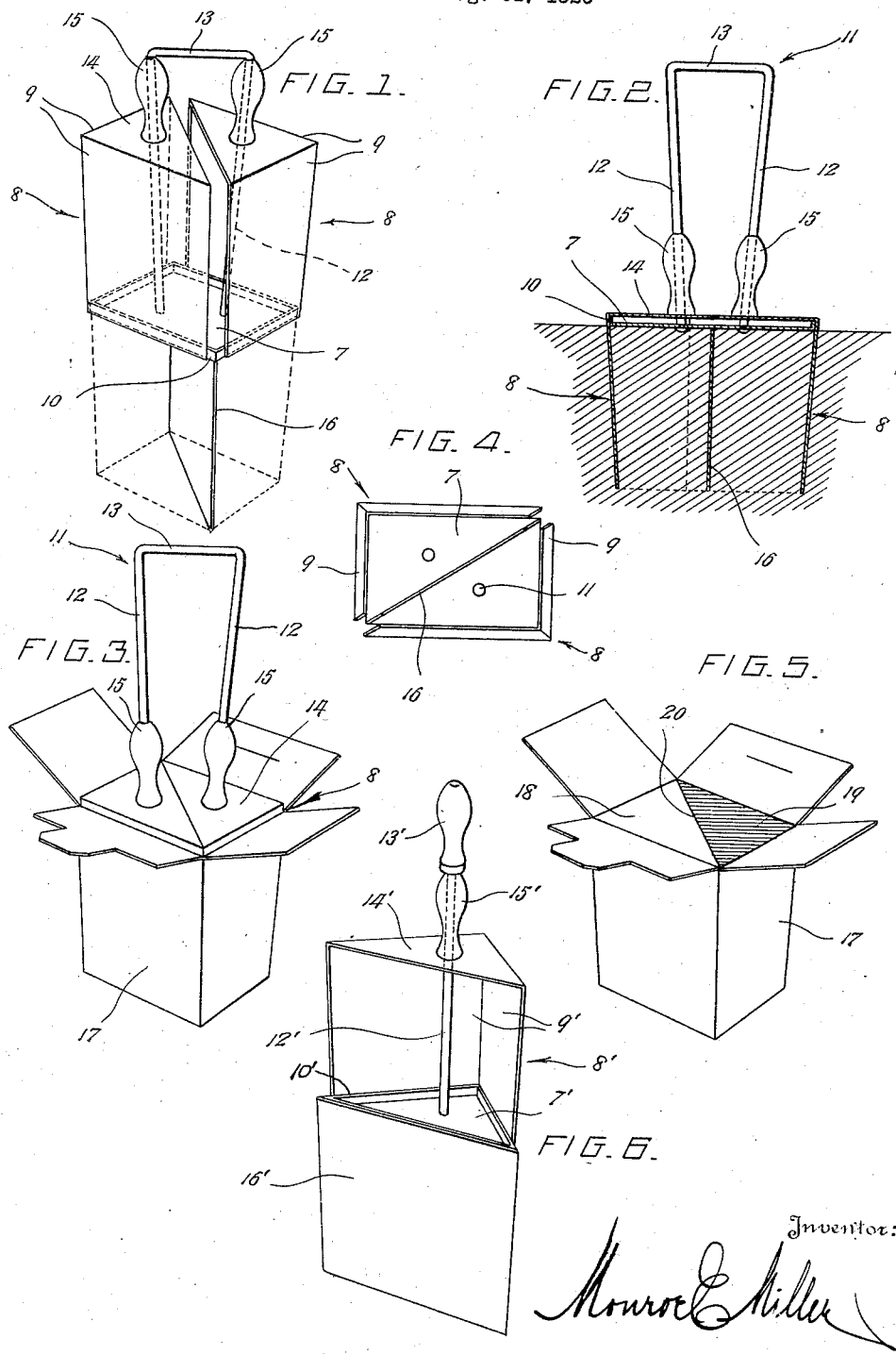

1,760,561

UNITED STATES PATENT OFFICE

MONROE E. MILLER, OF WASHINGTON, DISTRICT OF COLUMBIA

DIPPER FOR SEMISOLID MATERIALS

Application filed August 31, 1926. Serial No. 132,869.

The present invention relates to dippers or scoops for dispensing ice cream or other semisolid materials, and aims to provide a novel and useful device for scooping or dipping the ice cream or other material from a tub, can or other container and conveniently filling the ordinary paper pail such as used for ice cream when sold to the trade.

The ice cream and similar pails which are generally used are tapered downwardly, being in the form of an inverted frustrum of a rectangular pyramid, and, in filling such pails with ice cream or other semi-solid material, it is the practice to use a spoon or dipper by means of which the material is dipped in small quantities from the container and packed into the pail. This method not only involves labor and time, as well as inconvenience, but also fails to assure of any uniformity in the quantities of material delivered. Frequently the pails are not packed sufficiently full to give the customers the required amounts that they should receive, and the dealer sometimes loses by packing the material too tightly in the pails so that the sides of the pails bulge outwardly. This latter contingency is usually guarded against by placing the pail within a metal form to prevent the pail being bulged outwardly during the packing of the material therein.

It is the object of this invention to expedite the filling of such pails with ice cream or similar material by the provision of a simple and practical dipper, by means of which the material may be readily scooped or dipped from the container and delivered into the pail in predetermined form and quantity.

Another object is the provision of such a device by means of which the material may not only be conveniently dipped or scooped from the container, but which may also be conveniently manipulated for placing the material in the pail in a neat manner.

A further object is the provision of such a device which is not only simple in construction and operation, but which may also be readily washed and kept clean, so as to be sanitary, without having crevices or details of construction in or on which foreign matter would be apt to accumulate.

Still another object of the invention is the provision of a dipper by means of which the pail may be filled with two different kinds of ice cream or material in equal amounts, and in a neat and attractive manner, with the two materials both extending to and being exposed at the mouth of the pail, and with a definite plane of division between them.

A further object is the provision of a package including a pail or similar receptacle containing two different materials wherein both materials extend to and are exposed at the mouth of the pail or receptacle in a neat and attractive manner, and with a definite plane of division between the two materials.

Frequently a customer will desire two different flavors or kinds of ice cream or similar material, and it has been the practice to pack one kind of material in the lower portion of the pail and to then pack the other material over same, so that the two materials are superposed in the pail. The lower material is thus hidden, and it is also impossible to measure the two materials equally. Furthermore, it is also difficult if not impossible to separate the two materials in taking them from the pail, or to divide them equally. With the present dipper two materials may be deposited in the pail or receptacle in equal amounts and with a definite plane of division between them, and with both materials extending to and exposed at the mouth of the pail. This provides a neat and attractive appearance, and both materials are exposed when the pail is opened, and it is also possible to divide the two materials conveniently, such as by thrusting a knife or blade down between them. It is thus possible to conveniently dispense two kinds of material in the same pail, without using two smaller pails for the different materials, thereby providing for economy, and also serving the materials in the same pail to the customer in a condition which will be attractive and pleasing.

With the foregoing and other objects in view, which will be apparent as the invention is more fully understood from the detailed description, the invention resides in novel features of construction of the dipper and in a method of filling a pail or receptacle with two different materials, as hereinafter described and claimed, it being understood that changes may be made within the scope of the appended claims without departing from the spirit of the invention.

The invention is illustrated in the accompanying drawing, wherein—

Figure 1 is a perspective view of the dipper with the scoop or dipper blades retracted.

Fig. 2 is a median diagonal vertical section of the dipper showing the blades projected into the material.

Fig. 3 is a perspective view showing the dipper applied to a pail for depositing the material therein.

Fig. 4 is a bottom view of the dipper with the blades retracted.

Fig. 5 is a perspective view of a pail showing two kinds of material therein.

Fig. 6 is a perspective view of a modified form of dipper for use in filling a pail by two operations, either with the same or different materials, using a more simple construction.

In carrying out the invention there is provided a horizontal top plate 7 which is of an outline the same as that of the mouth or upper end of the size of pail for which the dipper is intended, and it will be understood that the dipper may be made in various sizes, such as for quart, pint and half-pint pails. These pails are usually of rectangular outline and in the shape of an inverted frustrum of a rectangular pyramid. Slidable across the edges of the top plate 7 is a pair of diagonally opposite scoop or dipper blades 8, which are of angular cross-section. Each blade has a pair of inclined flat wings 9 arranged at an angle to one another, and the blade is disposed astride the corresponding corner of the top plate 7. The wings 9 of the blades are of the same shape as the side walls of the pail for which the dipper is intended, so that when the blades are moved downwardly, as seen in Fig. 2, the blades 8 and top plate 7 define the outline of the pail, with the edges of the blades disposed together, and the dipper thus forms a mold of the same shape as the pail. The wings 9 are inclined and converge downwardly to correspond with the side walls of the pail, and the top plate 7 preferably has an upturned flange 10 around its margin to provide broad bearing surfaces for the blades and to also prevent the lower ends of the blades from disengaging the top plate when the blades are retracted, as seen in Fig. 1. Said flange 10 will also stiffen the top plate, so that the top plate and blades may be made of thin sheet metal. The side edges of the wings 9 are straight and converge downwardly so that when the dipper is positioned within the ice cream or similar pail said edges of the wings or blades are substantially parallel with the corresponding corners between the side walls of the pail, and the lower or narrower ends of the wings are straight and parallel with the top plate 7 so as to move close adjacent to and parallel with the bottom of the pail.

In order to manipulate the plate 7 and blades 8 and slide them relatively to one another, cooperating handle members are connected thereto. A rod 11 bent into arch form has its ends secured to the plate 7 at points spaced inwardly from the blades 8 and margin of the plate 7, and has the inclined downwardly-converging arms 12 connected at the upper ends by a yoke 13 forming a handle for the plate 7. The blades 8 are provided with webs or plates 14 between the upper edges of the wings 9 on which upstanding handles 15 are secured, and said handles 15 are tubular and are slidable on the arms 12 to guide the blades 8 for proper upward and downward movement along downwardly converging lines. The handles 15 enable the blades 8 to be conveniently moved downwardly and upwardly to projected and retracted positions, as well as guiding the blades, and the blades being disposed astride corner portions of the plate 7, with the wings 9 bearing against the flange 10, will prevent the blades 8 from turning on the arms 12.

The blades move upwardly and downwardly along the lines of intersection of the planes of the wings 9, whereby said wings of each blade remain in the same planes in the upward and downward movements of the blade, and the edges of the blades are therefore separated when the blades are moved upwardly, as seen in Fig. 1. Furthermore, the wings remain in contact with the flange 10 of the plate 7 in the different positions of the blades, and the blades may move upwardly and downwardly freely. The arms 12 are parallel with the lines of intersection of the planes of the wings 9, or with the corners of the blades which extend along said lines. The blades are therefore guided along straight lines which coincide with the corners or elbows of the blades.

The construction is simple and may be readily manufactured. The device is also readily kept clean, for the purpose of sanitation, and it is only necessary to place the device in water to dissolve ice cream or other material which may cling to the plate 7 or blades 8.

If the dipper is especially intended for filling a pail with two kinds of material, a partition blade 16 is secured rigidly at its upper end to the top plate 7 and depends from said plate. The partition blade 16 is disposed in the plane dividing the blades 8 or in which the side edges of said blades are disposed when the blades are projected downwardly. Thus, when the blades are projected downwardly the partition blade 16 is disposed directly across each blade between the side edges thereof, and said partition blade therefore divides the chamber or cavity of the dipper diagonally into two equal triangular spaces. The blade 16 may be used when dispensing the same or different materials, but may be omitted when the dipper is intended for dispensing only a single kind of material. The presence of such blade 16, however, enables the dipper to be used for filling a pail with two different kinds of material in an attractive and advantageous manner, as will hereinafter more fully appear. The blade 16 is tapered downwardly so as to conform to the shape of the blades 8 and pail for which the dipper is intended.

In using the dipper, the blades 8 are retracted, as seen in Fig. 1, if not already in such normal position, and the device is then brought to a position with the plate 7 bearing on the material, and the blade 16 entering the material. The device may be manipulated so that the plate 7 will pack the material down underneath same, such as when the surface of the material is rough from previous dippings taken therefrom. In this way, the device may be manipulated for packing or pressing the material below the plate 7 before dipping the material from the bulk. The handles 15 are then slid downwardly, preferably one at a time while holding the handle 13 in one hand and grasping a handle 15 by the other hand. The blades 8 therefore cut down into the material below the plate 7, and cut a block of material which corresponds directly to the shape of the pail. The blades 8 preferably have their lower and side edges sharpened so that the blades will cut down into the material with little or no resistance, and then, by lifting the handle 13, the dipper is lifted from the material, thereby extracting the block of material which fills the dipper. By oscillating the device slightly when lifting same from the material, the material may be made to break off fairly uniformly across the lower end of the dipper. Any excess material below the lower edges of the blades may be readily scraped off, or the dipper may be pressed down into the material again for completely filling the dipper if the break occurs above the lower edges of the blades. The block or material within the dipper increasing in size from the lower edges of the blades will be readily lifted out of the bulk by the blades. The dipper is then placed directly in the pail 17, it being noted that the blades 8 are of the same shape as the side walls of the pail so as to readily enter the pail and bear against the side walls thereof, as seen in Fig. 3. Then, by holding the handle 13 the blades 8 are retracted one at a time, by pulling upwardly on the handles 15, and the plate 7 holds the material in the pail, so as to strip the material from the blades as they are retracted. If the blade 16 is used on the dipper, the handle 13 is then lifted to withdraw said blade 16 from the material, and the dipper may be oscillated in the plane of the blade 16 during the withdrawal thereof so as to prevent the material being lifted with said blade. However, in the use of the dipper as described, the blade 16 is not necessary, but it may assist in the more uniform breaking off of the material at the lower end of the dipper, by confining the breaks between the lower edges of the blades 8 and 16, rather than between the lower edges of the blades 8 only.

It will therefore be understood that the material is dipped from the bulk in the exact shape and quantity to be deposited in and to fill the pail, and the operation may be performed quickly and conveniently, with uniform filling of the pails.

The dipper may also be advantageously used for filling the pail with two kinds of material. Thus, the dipper is placed in one kind of material with the plate 7 bearing on the material and the blade 16 entering the material, and one blade 8 is then moved downwardly, with the other blade 8 retained in retracted position. The dipper is then removed from the material, and will remove a triangular block of such material, as defined in the space between the blade 16 and the projected blade 8. Said blades 8 and 16 are then placed in the pail, and the blade 8 is retracted, to deposit the bare triangular block of the material in the pail at one side of one diagonal plane of the pail. The operation is then repeated for the other material, which is similarly inserted into the pail at the opposite side of said diagonal plane, and after the blades 8 and 16 are withdrawn, the pail will contain, as seen in Fig. 5, two adhering kinds or sections of material 18 and 19, both extending vertically from the bottom to the mouth of the pail, and both exposed at the mouth of the pail so to give an attractive and neat appearance when the pail is opened. The plane of division 20 between the materials 18 and 19 is arranged diagonally of the pail, and the two materials are the same in quantity and shape. The two materials may be readily separated by passing a knife or other blade between the materials in the plane of the division 20. Also, if desired, the block may be cut into slices at vertically spaced points, and each slice will contain the two different materials, with the slice of rectangular shape and the materials divided along a diagonal line. This method of filling the pail or receptacle with different materials is therefore of advantage in several respects as over the packing of one kind of material over another kind of material as now done or as over the use of two smaller pails or receptacles each containing one kind of material.

Fig. 6 illustrates a simplified form of dipper, which is not as large as the double blade dipper hereinbefore described, so that it may be manipulated more readily, especially for a larger size of pail and within a can of ordinary size used for supplying ice cream and similar materials in bulk to the dealers. This modified construction is substantially one-half of the double blade dipper, and includes the triangular top plate 7', which is substantially of the same shape as the plate 7 divided along the diagonal line of the blade 16. The plate 7' has the upturned marginal flange 10' and the upper end portion of the partition blade 16' overlaps and is secured to the diagonal portion of the flange 10'. A single scoop blade 8' is used and has the wings 9', the edges of which abut the edges of the blade 16' when the blade 8' is projected downwardly. An upwardly extending rod or arm 12' is secured at its lower end to the plate 7' and has a handle 13' at its upper end, and the blade 8' has the web or plate 14' at its upper end provided with the tubular handle 15' slidable on the rod or arm 12'. This device is used similar to the device hereinbefore described as when such device is manipulated using one blade 8 only. Thus, when the blade 8' is projected into the material, a triangular block of material may be removed and deposited in one corner portion of the pail, and the operation is then repeated for the same or different material to deposit the material into the opposite corner portion of the pail. The operation is repeated for the same or different materials, but the pail may be filled in substantially the same time, using a dipper of smaller size and more simple construction.

Having thus described the invention, what is claimed as new is:—

1. A dipper comprising a top plate, upwardly extending arms connected thereto, a handle connecting said arms, blades slidable relatively to said plate to be projected below and retracted above said plate, and handles connected to said blades and each slidable on one of said arms.

2. A dipper comprising a top plate to bear on the material, a depending partition blade secured rigidly thereto, and a blade slidably connected with said plate to be projected below and retracted above said plate.

3. A dipper comprising a top plate, a depending partition blade secured thereto, and a blade slidably connected with said plate to be projected below and retracted above said plate, said blades jointly being of triangular outline.

4. A dipper comprising a top plate, a depending partition blade secured thereto, and a blade slidably connected with said plate to be projected below and retracted above said plate, the partition blade being of a shape to be disposed diagonally within a pail of rectangular form, and the slidable blade being of angular cross-section and having wings corresponding in shape to two adjacent side walls of said pail.

5. A dipper comprising a top plate, a depending downwardly tapered partition blade secured thereto and of a shape to be disposed diagonally within a pail having the shape of the inverted frustrum of a pyramid, and a blade of angular cross-section slidably connected with said plate to be projected below and retracted above said plate and having wings tapered downwardly to correspond in shape to two side walls of said pail.

6. A dipper comprising a top plate, a depending partition blade secured thereto and of a shape to be disposed diagonally within a pail having the shape of the inverted frustrum of a pyramid, a blade of angular cross-section slidable relatively to said plate to be projected below and retracted above said plate and having wings tapered downwardly to correspond in shape to two side walls of said pail, and means between said plate and scoop blade for guiding said scoop blade for upward and downward movement along the line of intersection of the planes of said wings.

7. A dipper comprising a top plate and blades, said blades jointly being of triangular outline corresponding to two side walls and a diagonal plane of a rectangular receptacle, and means for holding the plate and blades assembled with one blade slidable relatively to said plate to be projected below and retracted above said plate.

8. A dipper comprising a top plate, a partition blade and a blade slidably connected with said plate to be projected below and retracted above said plate and being of angular cross-section, said partition blade being disposed diagonally with reference to the second named blade.

9. A dipper comprising a top plate, a partition blade, a blade of angular cross-section slidable relatively to said plate to be projected below and retracted above said plate having wings tapered downwardly, said partition blade being disposed diagonally with reference to said wings, and means between the plate and slidable blade for guiding said slidable blade for upward and downward movement along the line of intersection of the planes of said wings.

10. A dipper comprising a top plate, blades movable downwardly and upwardly relatively to said top plate to be projected below and retracted above said plate, said blades having web portions at their upper ends above said plate, upwardly extending arms secured to said plate, and handles connected with said web portions and slidable on said arms for guiding the blades relatively to said plate.

11. A dipper comprising a top plate, and inclined blades slidably connected with said plate for movement along downwardly converging straight lines to be projected below and retracted above said plate, said blades being disconnected from one another so as to slidable independently of one another relatively to said plate.

12. A dipper comprising a top plate, and inclined blades slidably connected with said plate for movement along downwardly converging straight lines to be projected below and retracted above said plate, said blades being disconnected from one another so as to be slidable independently of one another relatively to said plate, and individual handles connected to said plate and blades for manipulating them and sliding them relatively to one another.

13. A dipper comprising a top plate, inclined blades slidable relatively to said plate along downwardly converging straight lines to be projected below and retracted above said plate, and slidably connected individual handle members connected to said plate and blades to manipulate them and to guide them for relative sliding movements, said plate and blades and their handle members being disconnected from one another so that the plate and blades may be slid independently of one another.

In testimony whereof I hereunto affix my signature.

MONROE E. MILLER.